United States Patent
Zhao et al.

(10) Patent No.: US 9,749,003 B2
(45) Date of Patent: Aug. 29, 2017

(54) SECOND ORDER HARMONIC CANCELLATION FOR RADIO FREQUENCY FRONT-END SWITCHES

(71) Applicant: SKYWORKS SOLUTIONS, INC., Woburn, MA (US)

(72) Inventors: Huan Zhao, Irvine, CA (US); Qiang Li, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 309 days.

(21) Appl. No.: 14/272,747

(22) Filed: May 8, 2014

(65) Prior Publication Data
US 2014/0335802 A1    Nov. 13, 2014

Related U.S. Application Data

(60) Provisional application No. 61/820,906, filed on May 8, 2013.

(51) Int. Cl.
*H04B 1/48* (2006.01)

(52) U.S. Cl.
CPC ......... *H04B 1/48* (2013.01); *H04B 2001/485* (2013.01)

(58) Field of Classification Search
CPC ..................... H04B 1/48; H04B 2001/485
See application file for complete search history.

(56) References Cited

U.S. PATENT DOCUMENTS

| | | | | |
|---|---|---|---|---|
| 2004/0141470 | A1* | 7/2004 | Kelcourse | H01P 1/15 370/282 |
| 2004/0152426 | A1* | 8/2004 | Suzuki | H04B 1/48 455/83 |
| 2009/0073078 | A1* | 3/2009 | Ahn | H03K 17/063 343/876 |
| 2011/0003563 | A1* | 1/2011 | Gorbachov | H01Q 21/0025 455/78 |
| 2011/0221519 | A1 | 9/2011 | Katoh et al. | |
| 2012/0262217 | A1* | 10/2012 | Gorbachov | H04B 1/48 327/382 |

OTHER PUBLICATIONS

Search Report and Written Opinion for PCT/US14/37372; Oct. 3, 2014; 9 pages.

* cited by examiner

*Primary Examiner* — Lewis West
(74) *Attorney, Agent, or Firm* — Stetina Brunda Garred & Brucker

(57) ABSTRACT

A radio frequency switch circuit with improved harmonic suppression and low insertion loss has an antenna port and a plurality of signal ports. A plurality of transistor switch circuits, are connected to a respective one of the plurality of signal ports and to the antenna port. Each of the transistor switch circuits has a transistor, which in an off state, together with a harmonic suppression capacitor and a parallel inductor both connected thereto, define a tank circuit that suppresses RF signals applied to the corresponding transistor switch circuit from a different one of the transistor switch circuits. The harmonic suppression capacitor is tuned to distribute large signal voltage swings in the RF signal amongst parasitic diodes of the transistor.

20 Claims, 7 Drawing Sheets

SECOND ORDER HARMONIC CANCELLATION FOR RADIO FREQUENCY FRONT-END SWITCHES

CROSS-REFERENCE TO RELATED APPLICATIONS

This application relates to and claims the benefit of U.S. Provisional Application No. 61/820,906, filed May 8, 2013 and entitled SECOND ORDER HARMONIC CANCELLATION FOR RADIO FREQUENCY FRONT END SWITCHES, the entirety of the disclosure of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to radio frequency (RF) signal circuitry, and more particularly, to second order harmonic cancellation for switches in RF front end circuits.

2. Related Art

Complex, multi-function electronic devices are comprised of many interconnected modules and components, each of which serves a dedicated purpose. As a general example, wireless communication devices may be comprised of a transmit chain and a receive chain, with the antenna and the transceiver circuit being a part of both the transmit chain and receive chain. The transmit chain may additionally include a power amplifier for increasing the output power of the generated RF signal from the transceiver, while the receive chain may include a low noise amplifier for boosting the weak received signal so that information can be accurately and reliably extracted therefrom.

The low noise amplifier and the power amplifier may together comprise a front end module or front end circuit, which also includes an RF switch circuit that selectively interconnects the power amplifier and the low noise amplifier to the antenna. The connection to the antenna is switched between the receive chain circuitry, i.e., the low noise amplifier and the receiver, and the transmit chain circuitry, i.e., the power amplifier and the transmitter. In time domain duplex communications systems where a single antenna is used for both transmission and reception, this switching between the receive chain and the transmit chain occurs rapidly many times throughout a typical communications session.

In the local area data networking context, WLAN or Wireless LAN, also commonly referred to as WiFi, as well as 802.11 (referring to the governing IEEE standard), is widely deployed. WLAN utilizes frequency allocations in the Industrial-Scientific-Medical (ISM) band, and specifically the 2.45 GHz range, also colloquially referred to as the 2 GHz band. More recent iterations of the IEEE WLAN standard also specify the use of the 5 GHz range in the ISM band, for which usage has been licensed. Another common local wireless data communications modality is Bluetooth, which is often utilized to interconnect peripheral devices. Because Bluetooth also utilizes the 2 GHz ISM band, the same antenna, as well as common blocks such as the oscillator circuit, bandgap reference, and power management units for WLAN signals may be shared. Accordingly, the 2 GHz antenna may be connected to a single pole, triple throw (SP3T) switch with a terminal for WLAN receive, another terminal for WLAN transmit, and a third terminal for Bluetooth signals (both transmit and receive). The 5 GHz antenna is exclusively utilized for WLAN transmit/receive, so a single pole, double throw (SPDT) switch is utilized.

An RF switch has several performance parameters, including insertion loss, isolation, return loss, and linearity. Insertion loss refers to the power lost in the RF switch, and is expressed in dB. It is defined by Pout−Pin (dB), where Pin is the input power applied to the RF switch, and Pout is the power at the output port of the RF switch. Isolation refers to the measure of signal attenuation, expressed in dB, between the active signal port and the inactive signal port. Return loss refers to the measure of input and/or output matching conditions, and is expressed in dB. Linearity, or power handling capability, is the capability of the RF switch to minimize distortion at high power output levels and is expressed in dBm. It is typically represented by the 1 dB compression point (P1 dB), or the point at which insertion loss is degraded by 1 dB. Harmonic distortion for a given output power level is expressed in dBc, or the dB below the carrier or fundamental frequency.

Generally, RF switches must generate as little harmonic distortion as possible. Governmental standards also restrict the output of spurious emissions including those from harmonic distortion to either −70 dBc or 43+10 log(P). Conventional front end circuits, including the RF switch, are fabricated on a bulk CMOS (complementary metal oxide semiconductor) substrate. However, there is a performance tradeoff between insertion loss and harmonic distortion under large signal operation. Furthermore, because of low mobility, low breakdown voltage, and high substrate conductivity associated with CMOS devices, an RF switch with low insertion loss, high isolation, wide bandwidth, and linearity is difficult to produce.

Stacked switches of series and shunt transistors may be utilized to sustain higher voltage swings, thereby improving the power handling and harmonics suppression characteristics. However, this is understood to result in a higher insertion loss because of the additional equivalent resistance of an "on" position. In one conventional implementation, a single switch may have an insertion loss of less than 0.8 dB, but with a second harmonic distortion of around −50 dBc and a third harmonic distortion of around −60 dBc at an output of 23 dBm. On the other hand, a triple-stacked switch may have an insertion loss greater than 1.3 dB, but with a much lower second harmonic distortion of around −63 dBc and a third harmonic distortion of around −83 dBc at an output of 23 dBm. Thus, insertion loss is higher than that of the stacked switches because of the resistance of three, as opposed to one transistor in the "on" state, and negatively impacts efficiency.

Therefore, there is a need in the art for an improved RF switch with harmonic suppression and low insertion loss.

BRIEF SUMMARY

The present disclosure is directed to an RF switch circuit with over 20 dB improvement in harmonic suppression while maintaining low insertion loss. One embodiment of the switch circuit may include an antenna port as well as a plurality of signal ports. Furthermore, the switch circuit may have a plurality of transistor switch circuits, each of which may be connected to a respective one of the plurality of signal ports and to the antenna port. Each of the transistor switch circuits may include a transistor, which in an off state, together with a harmonic suppression capacitor and a parallel inductor both connected thereto, define a tank circuit. The tank circuit may suppress RF signals applied to the corresponding transistor switch circuit from a different one of the transistor switch circuits. The harmonic suppression capacitor may be tuned to distribute large signal voltage swings in the RF signal amongst parasitic diodes of the transistor.

An RF single pole, triple throw switch is contemplated in accordance with another embodiment of the present disclosure. The switch may include a common pole terminal. Additionally, the switch may include a first signal terminal, a first control line terminal, a first transistor, a first transistor harmonic suppression capacitor, and a first inductor. The first transistor may have a body, a source connected to the first signal terminal, a drain connected to the common pole terminal, and a gate connected to the first control line terminal. The first transistor may be selectively activatable in response to a first enable signal applied to the first control line terminal. The first transistor harmonic suppression capacitor may be connected across the body and the drain of the first transistor. The first inductor may be connected to the source and the drain of the first transistor. The first inductor and the first transistor harmonic suppression capacitor may define a first tank circuit with the first transistor in a deactivated state that may block RF signals on the drain of the first transistor.

The switch may also include a second signal terminal, a second control line terminal, a second transistor, a second transistor harmonic suppression capacitor, and a second inductor. The second transistor may have a body, a source connected to the second signal terminal, a drain connected to the common pole terminal, and a gate connected to the second control line terminal. The second transistor may be selectively activatable in response to a second enable signal applied to the second control line terminal. The second transistor harmonic suppression capacitor may be connected across the body and the drain of the second transistor. The second inductor may be connected to the source and the drain of the second transistor. The second inductor and the second transistor harmonic suppression capacitor may define a second tank circuit with the second transistor in a deactivated state that may block RF signals on the drain of the second transistor.

Additionally, the switch may include a third signal terminal, a third control line terminal, a third transistor, a third transistor harmonic suppression capacitor, and a third inductor. The third transistor may have a body, a source connected to the third signal terminal, a drain connected to the common pole terminal, and a gate connected to the third control line terminal. The third transistor may be selectively activatable in response to a third enable signal applied to the third control line terminal. The third transistor harmonic suppression capacitor may be connected across the body and the drain of the third transistor. The third inductor may be connected to the source and the drain of the third transistor. The third inductor and the third transistor harmonic suppression capacitor may define a third tank circuit with the third transistor in a deactivated state that may block RF signals on the drain of the third transistor.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The present disclosure encompasses various embodiments of a radio frequency (RF) switch that minimizes insertion loss while improving harmonics suppression. The detailed description set forth below in connection with the appended drawings is intended as a description of the several presently contemplated embodiments of the filter, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1A:
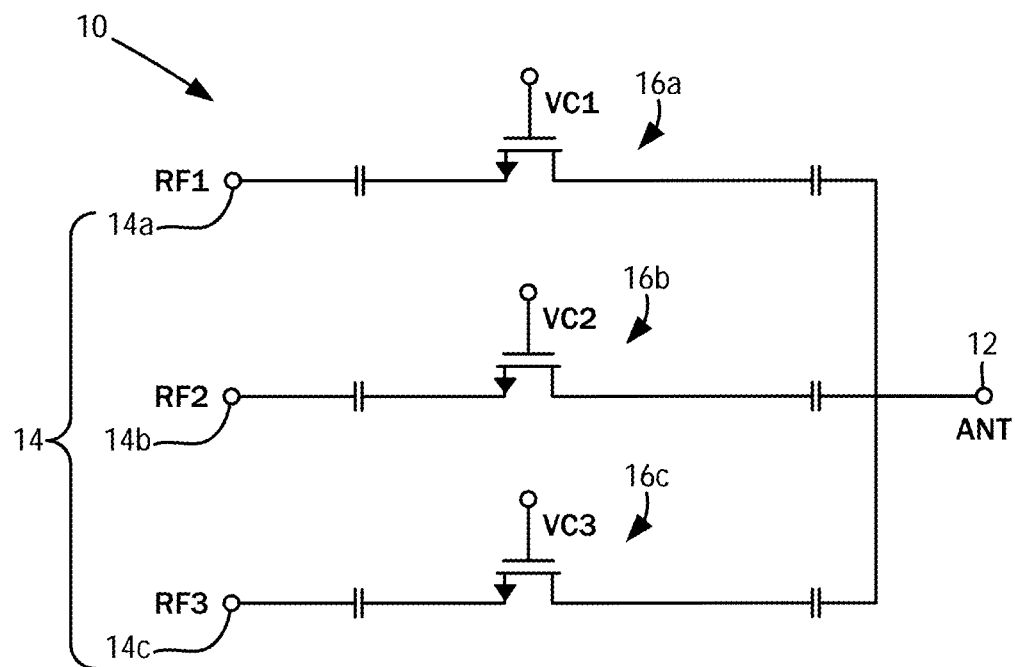
FIGS. 1A and 1B are simplified schematic diagrams of a single pole, triple throw RF switch implemented with switching transistors, FIG. 1A showing all switching transistors in an off state, and FIG. 1B showing one of the switching transistors in an on state.

The schematic diagram of FIG. 1A illustrates an example RF switch 10 that may be used to connect multiple transmission lines to an antenna. In this regard, the RF switch 10 has a single antenna port 12, and by way of example, three signal ports 14, including a first signal port 14a, a second signal port 14b, and a third signal port 14c. Each of the signal ports 14 are understood to be bi-directional, that is, RF transmit signals may be passed through the signal port 14 to the antenna port 12, and received RF signals on the antenna passed to the antenna port 12 may then be passed through the RF switch 10 to a receive component that is connected to the signal port 14. The RF switch 10 will be described in the context of this single pole, triple throw (SP3T), but it will be understood by those having ordinary skill in the art that it needed not be limited to such a configuration. Additional throws in the RF switch 10 may be incorporated. Furthermore, component values that are specific to a 2.4 GHz WLAN transmission modality will be referenced, though this is also by way of example only and not of limitation. The features described herein may be adapted to other switch configurations without departing from the scope of the present disclosure.

In further detail, the RF switch 10 may be comprised of multiple transistor switch circuits 16, including a first transistor switch circuit 16a connected to the first signal port 14a, a second transistor switch circuit 16b connected to the second signal port 14b, and a third transistor switch circuit 16c connected to the third signal port 14c, for the example SP3T switch 10. Each of the transistor switch circuits 16a-16c are also connected to the antenna port 12. Additional details of the transistor switch circuits 16 will be considered more fully below, but are generally understood to be comprised of a transistor that is turned on and turned off by a voltage control signal applied thereto. More particularly, the first transistor switch circuit 16a has a control input port VC1, the second transistor switch circuit 16b has a control input port VC2, and the third transistor switch circuit 16c has a control input port VC3. For example, the first transistor switch circuit 16a can be activated with a corresponding signal on the control input port VC1 to allow a signal on the first signal port 14a to pass to the antenna port 12.

Figure 1B:
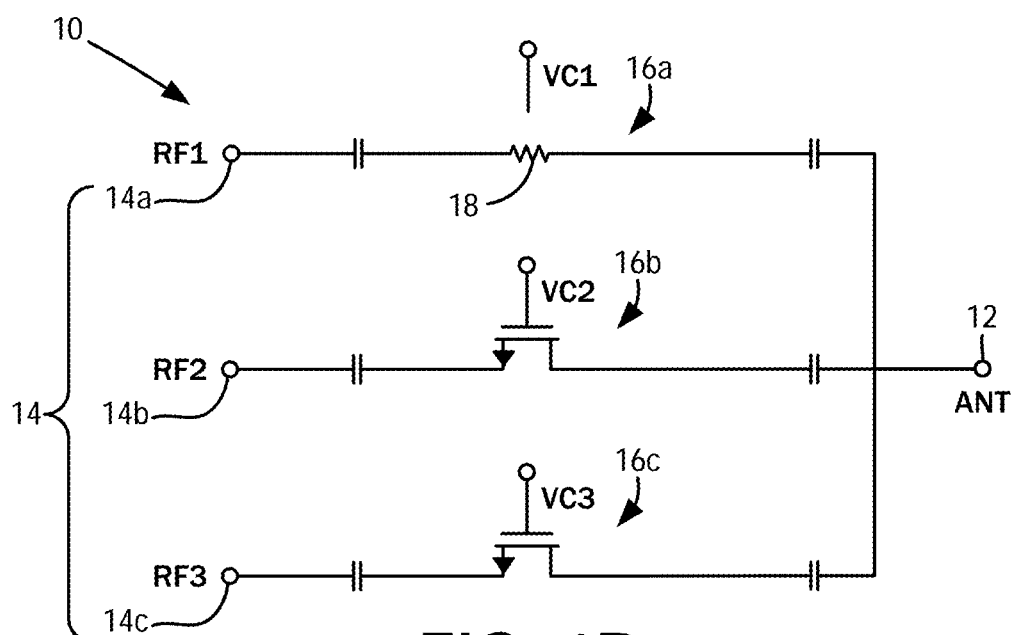

An equivalent circuit with the first transistor switch circuit 16a activated is shown in FIG. 1B, where the first transistor switch circuit, which is turned on, is represented as a small series resistor 18. In accordance with one embodiment of the present disclosure, the resistor 18 may have a value of approximately 1.8 Ohm. When passing high power RF signals through the first transistor switch circuit 16a, the other parasitic elements are understood to have a little to no impact on harmonic distortion.

In line with the RF switch 10 being a single pole, triple throw type, when any one of the transistor switch circuits 16 are activated, then the others are deactivated. Thus, a disable signal may be applied (or no signal applied) to the control input port VC2 and the control input port VC3 to turn off the respective transistors. The parasitic elements of the transistor switch circuits 16 in the off state, however, are understood to affect harmonic distortion because of the non-linearity of such elements.

Figure 2A:
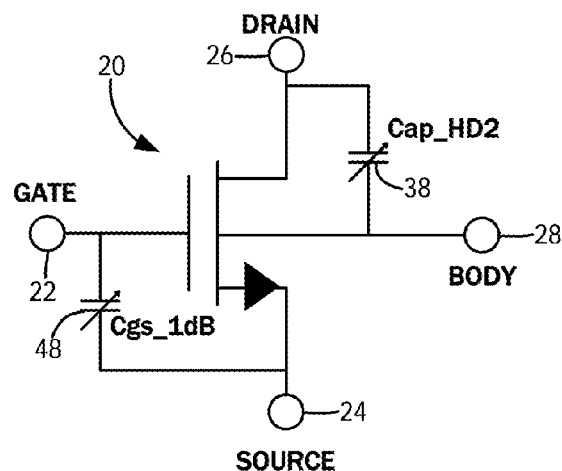
FIGS. 2A and 2B are schematic diagrams of an exemplary negative metal oxide semiconductor (NMOS) transistor including a harmonic suppression capacitor and a transistor activation suppression capacitor in accordance with the embodiments of the present disclosure, with FIG. 2B showing the equivalent circuit components of the transistor in the off state.

With reference to the schematic diagrams of FIG. 2A, each of the transistor switch circuits 16a-16c are understood to include, among other components, a transistor 20. In one embodiment, the transistor 20 has a n-type metal oxide semiconductor (NMOS) structure that can be fabricated with a bulk production process. However, it will be recognized that the transistor 20 may be fabricated in accordance with any other suitable semiconductor process by which other RF integrated circuits may be fabricated, such as silicon-on-insulator and the like. The transistor 20 has a gate 22, a source 24, a drain 26, and a body 28. The operating voltage of the transistor 20 may be 3.3 V.

Figure 2B:
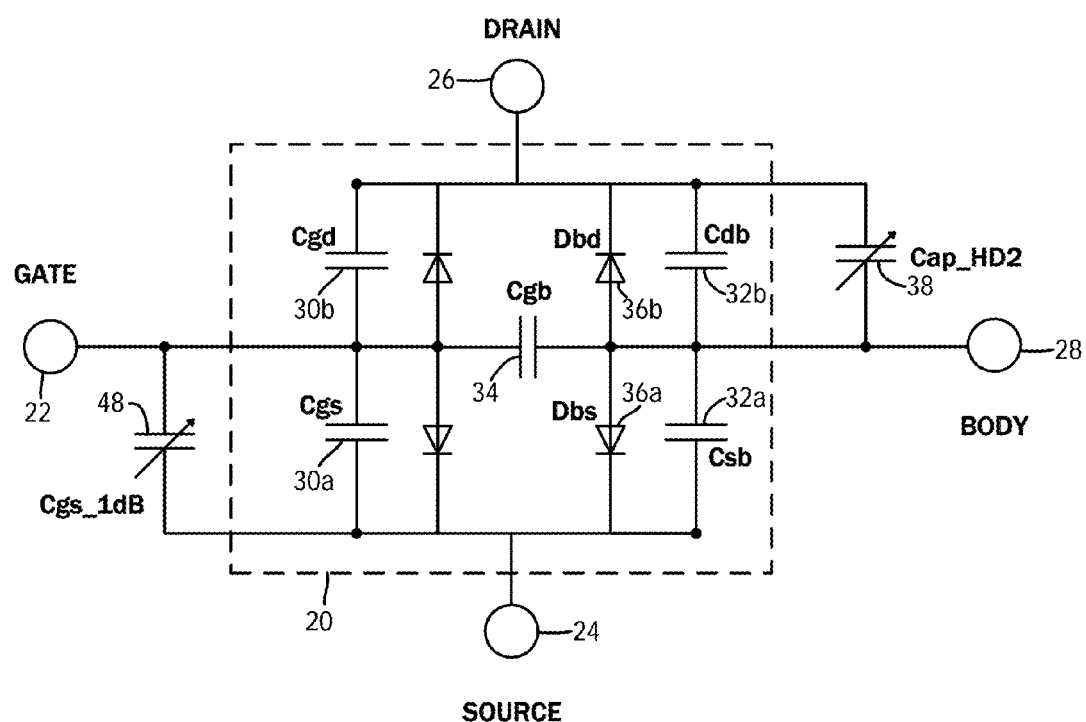

As best shown in the schematic diagram of FIG. 2B, an equivalent circuit of the transistor 20 in the off state is defined by a number of parasitic elements. Between the gate 22 and the source 24 there is a parasitic overlap capacitance $C_{gs}$ 30a, and between the gate 22 and the drain 26 there is a parasitic overlap capacitance $C_{gd}$ 30b. Furthermore, between the source 24 and the body 28 there is a parasitic junction capacitance $C_{sb}$ 32a, and between the body 28 and the drain 26 there is a parasitic junction capacitance $C_{db}$ 32b. There is also a parasitic gate oxide capacitance $C_{gb}$ 34 between the gate 22 and the body 28. Between the body 28 and the source 24, there is a parasitic diode $D_{bs}$ 36a, and between the body 28 and the drain 26 there is a parasitic diode $D_{bd}$ 36b. These diodes 36 are typically reverse biased.

Figure 3:
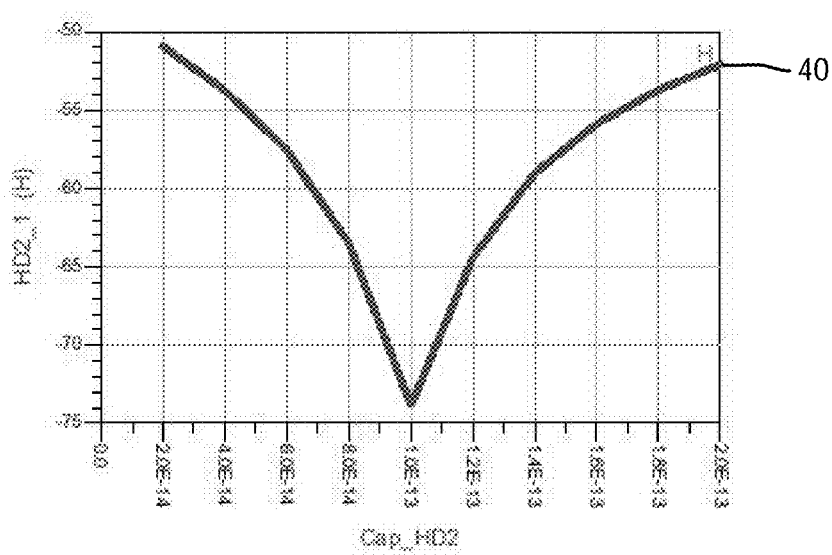
FIG. 3 is a graph showing a plot of harmonic suppression against a sweep of the harmonic suppression capacitor values.

Various embodiments of the present disclosure contemplate a harmonic suppression capacitor Cap_HD2 38 that is connected to the drain 26 and the body 28. It is understood that the harmonic suppression capacitor 38 optimizes second order harmonic distortion by re-distributing large voltage swings in the input RF signal across the parasitic diodes $D_{bs}$ 36a and $D_{bd}$ 36b. The graph of FIG. 3 includes a plot 40 of the harmonic suppression against a sweep of the harmonic suppression capacitor Cap_HD2 38. Each grid marker along the y-axis represents 5 dB of harmonic suppression, and as shown, over 20 dB of harmonic suppression may be realized based upon a proper selection of the component value. In the illustrated example, the capacitance value at which there is the most harmonic suppression is 0.1 pF, in comparison to peaks at the 0.02 pF and 0.2 pF ends.

Figure 4:
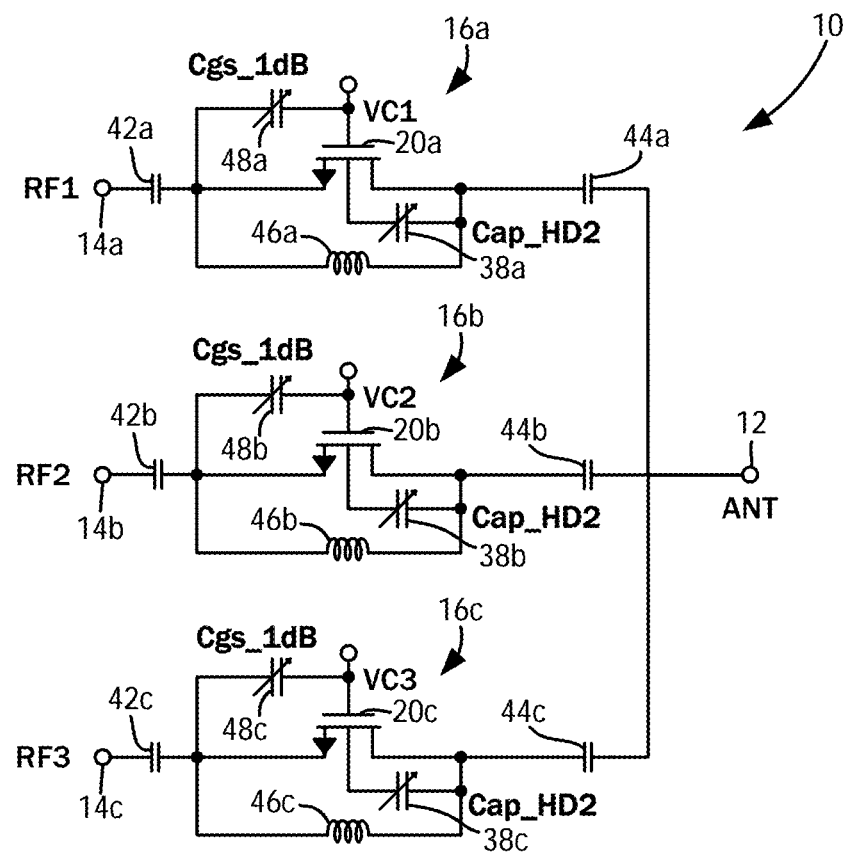
FIG. 4 is a schematic diagram of an exemplary RF single pole, triple throw switch in accordance with another embodiment of the present disclosure.

The schematic diagram of FIG. 4 illustrates an embodiment of the RF switch 10, including the aforementioned harmonic suppression capacitor Cap_HD2 38. Furthermore, each of the transistor switch circuits 16 is understood to have a source-side DC blocking capacitor 42. More particularly, the first transistor switch circuit 16a has a first source-side DC blocking capacitor 42a connected to the source 24 of the first transistor 20a and to the first signal port 14a. The second transistor switch circuit 16b has a second source-side DC blocking capacitor 42b connected to the source 24 of the second transistor 20b and to the second signal port 14b. The third transistor switch circuit 16c has a third source-side DC blocking capacitor 42c connected to the source 24 of the third transistor 20c and to the third signal port 14c.

Along these lines, each of the transistor switch circuits 16 also has a drain-side DC blocking capacitor 44. Accordingly, the first transistor switch circuit 16a has a first drain-side DC blocking capacitor 44a connected to the drain 26 of the first transistor 20a and to the antenna port 12. The second transistor switch circuit 16b has a second drain-side DC blocking capacitor 44b connected to the drain 26 of the second transistor 20b and to the antenna port 12. The third transistor switch circuit 16c has a third drain-side DC blocking capacitor 44c connected to the drain 26 of the third transistor 20c and to the antenna port 12.

These DC blocking capacitors 42, 44 are understood to isolate the bias voltage being applied to the transistor switch circuits 16. Additionally, these capacitors are understood to define a resonant circuit with the package parasitic inductance in the operating frequency, which in accordance with the illustrated example, is the WLAN 2.4 GHz frequency.

Connected in parallel to the transistor 20 in each of the transistor switch circuits 16, that is, across the source 24 and the drain 26, is an inductor 46. Thus, the first transistor switch circuit 16a includes a first inductor 46a, the second transistor switch circuit 16b includes a second inductor 46b, and the third transistor switch circuit 16c includes a third inductor 46c. Together with the harmonic suppression capacitor Cap_HD2 38, and the transistor 20 in the off state, the inductor 46 defines a tank circuit that is contemplated to suppress RF signals that are on the antenna port 12 (and hence the drain 26 of each transistor 20 that has been turned off) from leaking to the signal ports 14 of the deactivated transistor switch circuits 16. As such, an improvement in the isolation between the different transistor switch circuits 16a-16c is envisioned.

Referring to FIGS. 2A, 2B, and 4, there is also a transistor activation suppression capacitor Cgs_1 dB 48 that is connected across the gate 22 and the source 24 of the transistor 20. The configuration of the transistor activation suppression capacitor Cgs_1 dB 48 is more fully described in co-pending U.S. patent application Ser. No. 13/273,529 filed Oct. 14, 2011 and entitled "RADIO FREQUENCY MULTI-PORT SWITCHES," the entirety of the disclosure of which is wholly incorporated by reference herein. Generally, the capacitor 48, properly configured, may prevent large signal in the input RF signal from inadvertently turning on the transistor that has been deliberately turned off. In other words, high power compression may be optimized therewith. The first transistor switch circuit 16a has a first transistor activation suppression capacitor Cgs_1 dB 48a, the second transistor switch circuit 16b has a second transistor activation suppression capacitor Cgs_1 dB 48b, and the third transistor switch circuit 16c has a third transistor activation suppression capacitor Cgs_1 dB 48c. Together with the transistor activation suppression capacitor Cgs_1 dB 48, the harmonic suppression capacitor Cap_HD2 38 can also be optimized for harmonic distortion suppression.

Figure 5:
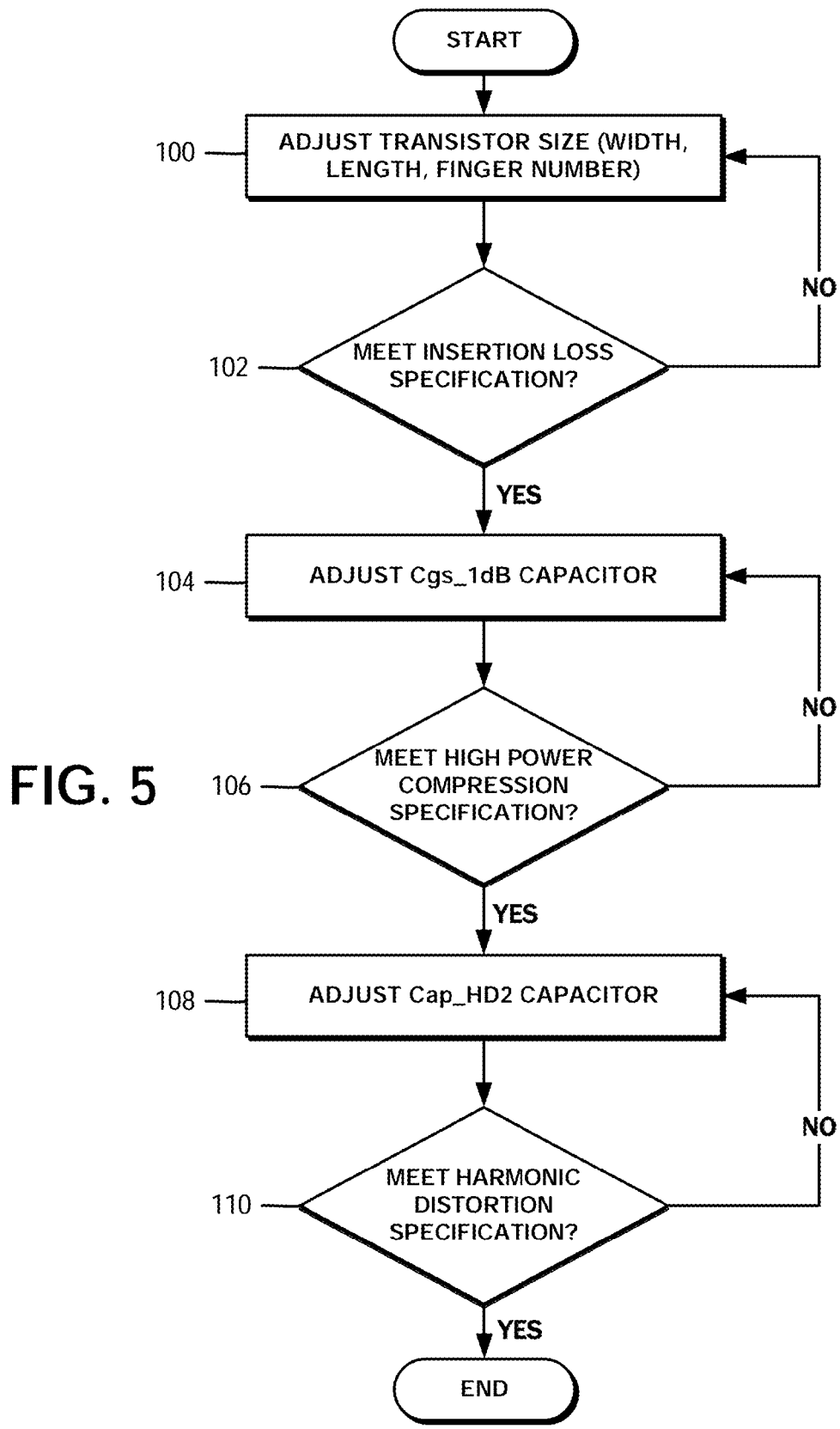
FIG. 5 is a flowchart illustrating a method for optimizing the component values for the harmonic suppression capacitor and the transistor activation suppression capacitor in the RF switch to minimize insertion loss and maximize harmonic suppression.

As shown in the flowchart of FIG. 5, an ordered method to optimize the values of the harmonic suppression capacitor Cap_HD2 and the transistor activation suppression capacitor Cgs_1 dB 48 is contemplated. The method may begin with a step 100 of selecting the transistor size, including the width, length, and finger number. In a decision block 102, the insertion loss specifications are evaluated to determine whether the aforementioned transistor configuration is sufficient. Next, in a step 104, the transistor activation suppression capacitor 48 is adjusted. If it is determined that the high power compression specification is met in a decision block 106, the method continues on to the next step, which involves modifying the harmonic suppression capacitor 38 in a step 108. Thereafter, the harmonic distortion specifications are evaluated for meeting the desired specification in a decision block 110. The method concludes if this is the case, otherwise, the harmonic suppression capacitor Cap_HD2 38 is further modified (without adjustment to any of the previously set values of the transistor activation suppression capacitor Cgs_1 dB 48 or the transistor size/configuration). In addition to these tuning steps, S-parameter and CW harmonic balance analysis steps are employed as well. This method may be implemented on any available electronic design automation software such as Agilent ADS, Golden-Gate, Cadence Spectre, and so forth.

Figure 6:
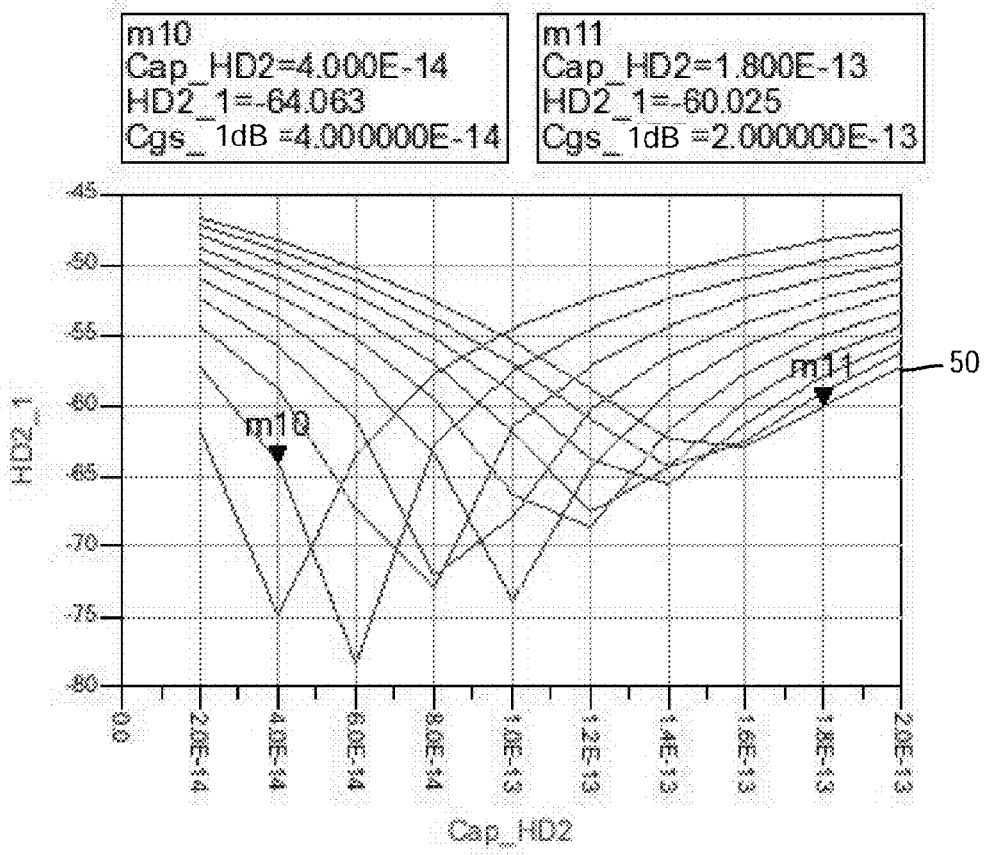
FIG. 6 is a graph showing a series of sweeps of the harmonic suppression capacitor values for different transistor activation suppression capacitor values.

Referring now to the graph of FIG. 6, there are a series of plots 50, each of which represents a sweep of values of the harmonic suppression capacitor Cap_HD2 38 for different values of the transistor activation suppression capacitor Cgs_1 dB 48. In other words, the swept parameter is Cgs_1 dB, and the y-axis represents the second harmonic suppression given in dBc while the x-axis represents the value of the harmonic suppression capacitor Cap_HD2 38. The plot 50a, designated as m10, is where the transistor activation suppression capacitor Cgs_1 dB 48 has been assigned a value of 0.04 pF, while plot 50b, designated as m11, is where the transistor activation suppression capacitor Cgs_1 dB 48 has been assigned a value of 0.2 pF.

In configuring the RF switch 10, and in accordance with the method considered above, the value of the transistor activation suppression capacitor Cgs_1 dB 48 is selected to achieve the best peak power handing capability. Thereafter, the value of the harmonic suppression capacitor Cap_HD2 38 is selected that corresponds to the deepest notch in the plots 50 shown in FIG. 6.

Figure 7:
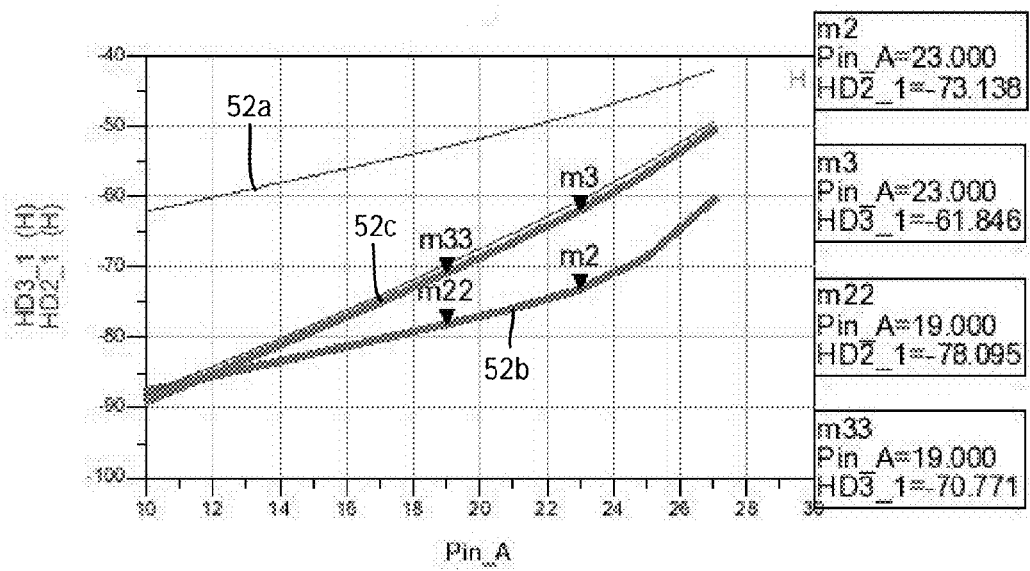
FIG. 7 is a graph plotting a comparison of the second and third harmonic suppression prior to the inclusion of the harmonic suppression capacitor and after inclusion of the harmonic suppression capacitor.

Referring to the graph of FIG. 7 there is depicted a comparison of the second and third harmonic suppression of the RF switch 10 with and without the harmonic suppression capacitor Cap_HD2 38. A first plot 52a is of the second harmonic distortion suppression of the transistor switch circuit 16 without the harmonic suppression capacitor Cap_HD2 38, while a second plot 52b is of the second harmonic distortion suppression of the transistor switch circuit 16 with the optimized harmonic suppression capacitor Cap_HD2 38. As shown, the second harmonic distortion suppression is improved by approximately 20 dB to over 78 dBc, which is understood to be significantly better than conventional stacked transistor variations. The third harmonic distortion suppression is shown in a third plot 52c, which does not depend on the existence of the harmonic suppression capacitor Cap_HD2 38.

Figure 8:
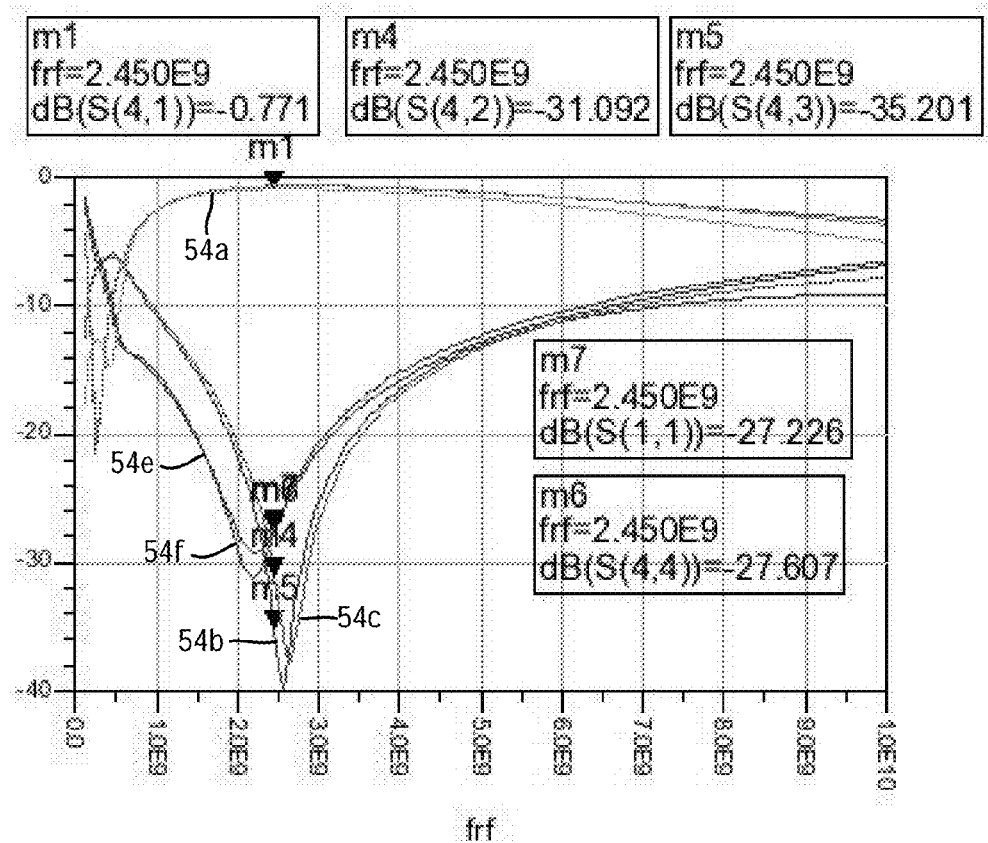
FIG. 8 is a graph plotting the S-parameters of the RF switch shown in FIG. 4.

The graph of FIG. 8 plots the various S-parameters of the RF switch 10. A first plot 54a shows the insertion loss $S_{41}$ where the first transistor switch circuit 16a is turned on while the others transistor switch circuits 16b, 16c are turned off. As shown, the insertion loss is under 1 dB. Furthermore a second plot 54b shows the isolation $S_{42}$ of the deactivated transistor switch circuit 16b, and a third plot 54c shows the isolation $S_{43}$ of the deactivated transistor switch circuit 16c. The return loss of the first signal port 14a $S_{11}$, and the return loss of the antenna port 12 $S_{44}$ are shown in plot 54d and plot 54e, respectively, and is not degraded.

The particulars shown herein are by way of example and for purposes of illustrative discussion of the embodiments of the RF switch only and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A radio frequency switch circuit, comprising:
   an antenna port;
   a plurality of signal ports;
   a plurality of transistor switch circuits each connected to a respective one of the plurality of signal ports and to the antenna port, each of the transistor switch circuits including a transistor which in an off state, together with a harmonic suppression capacitor connected to the transistor and a parallel inductor connected across a source and a drain of the transistor, define a tank circuit that suppresses radio frequency signals applied to the corresponding transistor switch circuit from a different one of the transistor switch circuits, the harmonic suppression capacitors being tuned to distribute large signal voltage swings in the RF signal amongst parasitic diodes of the transistors.

2. The radio frequency switch circuit of claim 1 wherein each of the transistor switch circuits includes a transistor activation suppression capacitor connected to the transistor and the signal port.

3. The radio frequency switch circuit of claim 2 wherein the transistor activation suppression capacitor is connected across a source and a gate of the transistor.

4. The radio frequency switch circuit of claim 2 wherein the transistor activation suppression capacitor is tuned to maximize peak power handling capacity of the transistor switch circuit.

5. The radio frequency switch circuit of claim 1 wherein each of the transistor switches define a minimal series resistance with the transistor thereof in an on state.

6. The radio frequency switch circuit of claim 1 further comprising a direct current blocking capacitor connected between each of the transistor switch circuits and the antenna port.

7. The radio frequency switch circuit of claim 1 further comprising a direct current blocking capacitor connected between each of the transistor switch circuits and the respective signal ports.

8. The radio frequency switch circuit of claim 1 wherein the transistors have an n-type metal oxide semiconductor field effect structure.

9. The radio frequency switch circuit of claim 1 wherein the signal ports and the transistor switch circuits number three to define a single pole, triple throw switch.

10. The radio frequency switch circuit of claim 1 wherein, in each of the transistor switch circuits, the harmonic suppression capacitor is connected to the drain and a body of the transistor.

11. The radio frequency switch circuit of claim 10 wherein each of the transistor switch circuits includes a transistor activation suppression capacitor connected to the transistor and the signal port.

12. The radio frequency switch circuit of claim 11 wherein, in each of the transistor switch circuits, the transistor activation suppression capacitor is connected across the source and a gate of the transistor.

13. The radio frequency switch circuit of claim 11 wherein, in each of the transistor switch circuits, the transistor activation suppression capacitor is tuned to maximize peak power handling capacity of the transistor switch circuit.

14. The radio frequency switch circuit of claim 11 wherein, in each of the transistor switch circuits, the harmonic suppression capacitor, together with the transistor activation suppression capacitor, is optimized for harmonic distortion suppression.

15. The radio frequency switch circuit of claim 10 further comprising a direct current blocking capacitor connected between each of the transistor switch circuits and the antenna port.

16. The radio frequency switch circuit of claim 10 further comprising a direct current blocking capacitor connected between each of the transistor switch circuits and the respective signal ports.

17. The radio frequency switch circuit of claim 1 wherein, in each of the transistor switch circuits, a first one of the parasitic diodes of the transistor is between the body and the drain thereof and a second one of the parasitic diodes of the transistor is between the body and the source thereof.

18. The radio frequency switch circuit of claim 17 wherein, in each of the transistor switch circuits, the tank circuit blocks a radio frequency signal at the drain of the transistor.

19. The radio frequency switch circuit of claim 1 wherein, in each of the transistor switch circuits, the source of the transistor is connected to the respective one of the plurality of signal ports and the drain is connected to the antenna port.

20. The radio frequency switch circuit of claim 1 wherein, in each of the transistor switch circuits, a gate of the transistor is connected to a respective one of a plurality of control line terminals, the transistor being selectively activatable in response to an enable signal applied to the respective one of the plurality of control line terminals.

\* \* \* \* \*